United States Patent
Vogeli

[11] 3,926,408
[45] Dec. 16, 1975

[54] GATE VALVE FOR CONTROLLING FLUID FLOW

[75] Inventor: Ernst Vogeli, Wiesendange, Switzerland

[73] Assignee: Sulzer Brothers Ltd., Winterthur, Switzerland

[22] Filed: Nov. 6, 1973

[21] Appl. No.: 413,380

[30] Foreign Application Priority Data
Nov. 7, 1972 Switzerland.................. 16226/72

[52] U.S. Cl.............................. 251/327; 251/329
[51] Int. Cl.[2]......................................... F16K 3/12
[58] Field of Search ............ 251/327, 326, 328, 329

[56] References Cited
UNITED STATES PATENTS

| | | | |
|---|---|---|---|
| 587,439 | 8/1897 | Jenkins............................... | 251/327 |
| 964,838 | 7/1910 | Badger............................... | 251/328 X |
| 1,909,479 | 5/1933 | Wilson............................... | 251/326 |
| 3,488,034 | 1/1970 | Masheder........................... | 251/326 X |

FOREIGN PATENTS OR APPLICATIONS

| | | | |
|---|---|---|---|
| 443,471 | 9/1912 | France............................... | 251/328 |
| 841,385 | 6/1952 | Germany........................... | 251/327 |
| 1,083,612 | 6/1960 | Germany........................... | 251/327 |
| 1,026,222 | 2/1953 | France............................... | 251/327 |

*Primary Examiner*—Arnold Rosenthal
*Attorney, Agent, or Firm*—Kenyon & Kenyon Reilly Carr & Chapin

[57] ABSTRACT

The gate valve is constructed with an inlet having a converging cross-section towards an outlet end. The inlet cross-section adjacent the valve gate of the outlet body end is at least 5% larger than the exit cross-section of the inlet end to enable the expanding jet from the inlet end to be accommodated without disturbance.

13 Claims, 1 Drawing Figure

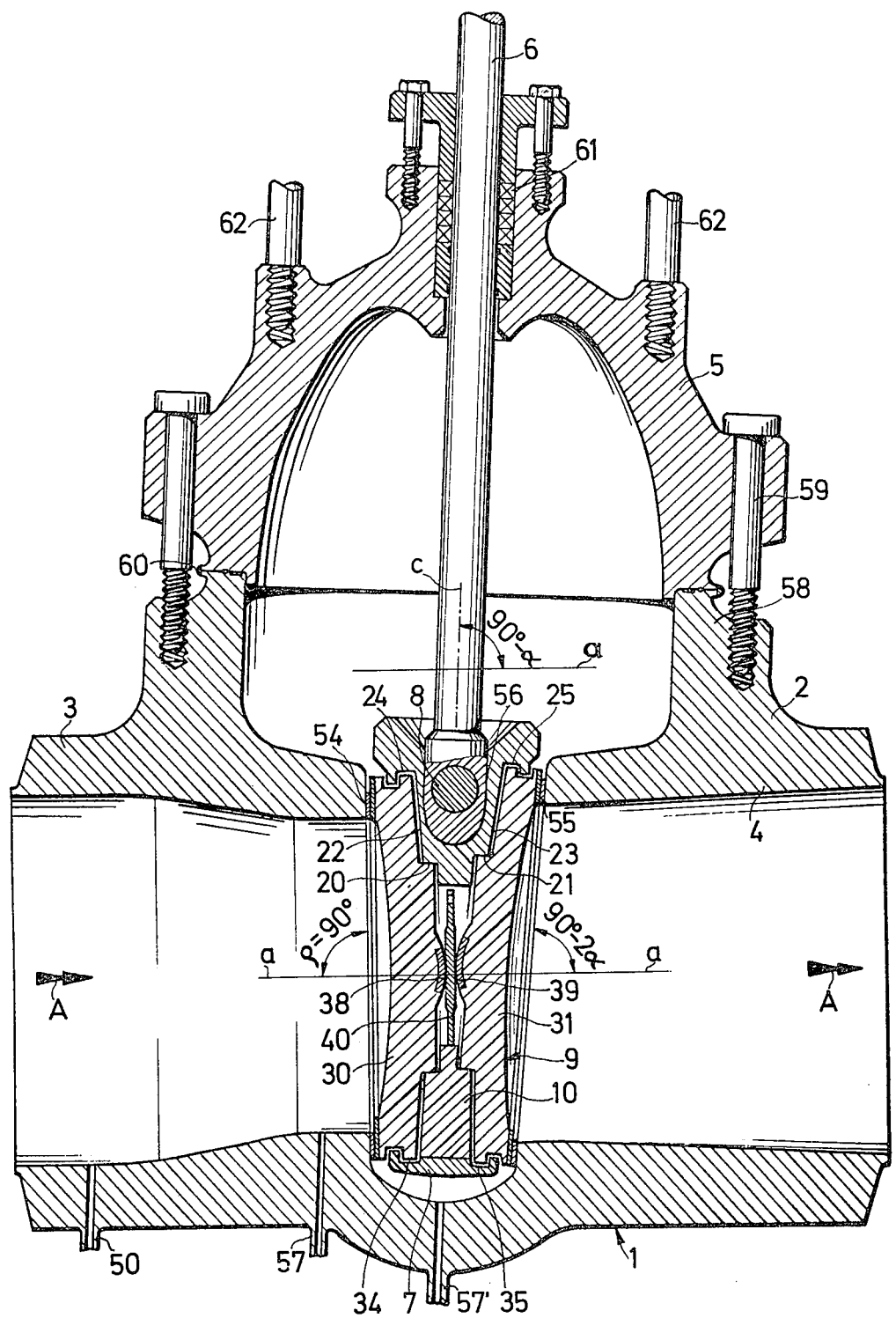

GATE VALVE FOR CONTROLLING FLUID FLOW

This invention relates to a gate valve for controlling fluid flow.

Gate valves have been known for controlling fluid flows in various environments. For example, gate valves have been used in nuclear steam power plants in pipe lines carrying steam from a steam generator to a steam turbine. Normally, the gate valves have been positioned in the pipelines in a fully-open position and have been constructed to close rapidly in the event of a fault. However, these valves have usually had an exit cross-section in the inlet end of identical size as the inlet cross-section in the outlet end. As a result, a diverging jet of fluid from the inlet end has been able to strike the margin about the inlet to the outlet end creating disturbances and pressure losses.

It is an object of the invention to provide a gate valve having a flow measuring means incorporated therein with a construction which facilitates fluid flow therethrough.

It is another object of the invention to avoid a pressure loss in a fluid flow in passing from one end of a gate valve to the other.

It is another object of the invention to provide a gate valve which is capable of controlling fluid flow in a relative easy manner.

Briefly, the invention provides a gate valve having a valve body with an inlet body end of converging crossection in the direction of fluid flow and an outlet body which has an inlet cross-section at least 5% larger than the exit cross-section of the inlet end.

The larger dimension of the inlet to the outlet body end enables the expanding jet which emerges from the outlet end of the inlet body end when the valve is fully open to be accommodated without disturbance in the outlet body end so that there is little back pressure created at the inlet end of the outlet body end. This may be contrasted with the usual arrangement in which the exit cross-section of the inlet body end and the inlet cross-section of the outlet body end are identical so that the diverging jet of fluid emerging from the inlet body end strikes the margin around the inlet to the outlet body end, leading to a pressure loss.

In one arrangement, the gate valve has a valve gate which is wedge-shaped. In addition, the body seat on the inlet body end is in a plane which is perpendicular to the axis of the body end and the axis of the valve gate is perpendicular to the axis of the inlet body end. With this arrangement, the exit cross-section of the inlet body end is perpendicular to the jet of fluid although the valve gate is wedge-shaped, so that the jet is not deflected after emerging as might be the case if the exit cross-section of the inlet body end was inclined in accordance with the half wedge angle of the valve gate. With this arrangement the valve gate will normally have a wedge angle which is asymmetrical relative to the axis of motion of the valve gate. However, a body seat on the inlet body end which is perpendicular to the axis of the inlet body end can be obtained, even for valves with a wedge-shaped valve gate having a wedge angle which is symmetrical with respect to the axis of motion of the valve gate, by arranging the axis of the valve gate at an angle inclined to the axis of the inlet body end with the body seat on the inlet body end in a plane which is perpendicular to the axis of the inlet body end.

In either of the described arrangements, the valve gate may include two discs each of which carries a gate sealing surface. In this case, one of the discs has a domed protuberance on the surface facing the other disc and a central disc is located between the seat-carrying discs. This disc also has a surface facing the protuberance which is of a material softer than that of the protuberance and is engageable by the protuberance. Alternatively, both seat-carrying discs may have protuberances engaging opposite sides of the central disc. These constructions are useful where there is any risk of the valve gate becoming jammed in the closed position between the body seats due to temperature changes. In such a case, the central disc of softer material prevents jamming of the valve gate since the protuberances are able to penetrate into the softer disc when the body shrinks. The domed protuberance of protuberances may be provided with hard metal facings.

These and other objects and advantages of the invention will become more apparent from the following detailed description and appended claims taken in conjunction with the accompanying drawing in which:

The drawing illustrates a longitudinal sectional view through a gate valve according to the invention.

Referring to the drawing, the gate valve 1 comprises a valve body 2, a bonnet 5, and a wedge-shaped valve gate 9 with a means such as an operating stem 6 for moving the valve gate 9. The valve body 2 has an inlet body end 3 and an outlet body end 4 through which a flow of fluid e.g. steam can pass through the valve 1 as indicated by the arrows A. The free cross-section of the inlet body end 3 converges so that the inner boundary, considered in the flow direction of the fluid is initially cylindrical, then merges into a conical section and finally terminates in a cylindrical section. This configuration corresponds to the shape conventionally used for flow metering orifices. The initial cylindrical section represents a region of maximum cross-section while the terminal cylindrical section represents a region of minimum cross-section. The outlet body end 4 has a diverging cross-section in the direction of flow of the fluid in the manner of a diffuser.

The bonnet 5 of the valve 1 is mounted on an annular collar or body neck 58 which is integral with the valve housing 2 and surrounds the operating stem 6, the bonnet being secured to the housing by bonnet screws 59. The contacting surfaces of the body neck 58 and of the bonnet 5 are additionally sealed by means of a lip weld 60. The operating stem 6 extends through a gland 61 in the bonnet 5 and is connected to a servo motor, not shown, which is mounted on the valve 1 by means of screw fasteners 62.

The end face at the exit of the inlet body end 3 and the end face of the inlet to the outlet body end 4 form body seats 54 and 55 for a valve gate 9 each of which comprises welded hard metal facings. These body seats 54, 55 cooperate with corresponding seat surfaces on the valve gate 9.

The axis $c$ of the operating stem 6 and therefore the axis of the wedge-shaped valve gate 9 are inclined with respect to the axis $a$ of the inlet body end 3 in such a way that the body seat 54 of the inlet body end 3 is disposed in a plane which is perpendicular to the axis of the inlet body end ($\rho = 90°$). Accordingly, the body seat 55 of the outlet body end 4 is positioned at an angle $90° - 2\alpha$) to the axis $a$ of the outlet body end 4, $\alpha$ being equal to the half wedge angle of the valve gate 9. This inclined arrangement of the valve gate axis ensures that when the valve gate is in the fully open position, the jet of the flowing fluid emerges symmetrically from the inlet body end 3. The outer surface of this jet forms a cone having a half cone angle which depends on the shape of the flow pattern obtained in the inlet body end 3. To prevent the jet from impinging against the body seat 55, the inlet cross-section of the outlet body end 4 is made sufficiently large to fully accommodate the jet, that is, the cross-section is at least 5% larger than the exit cross-section of the inlet body end 3. There is therefore only a small pressure loss across the fully opened valve. The cross-section of the outlet body end 4 expands in the manner of a diffuser in the flow direction of the fluid.

The flow rate through the valve 1 can be measured by a suitable flow measuring means and to this end a pair of tappings 50, 57 are provided in the valve body as more fully described in my companion application corresponding to copending U.S. application Ser. No. 413,381, filed Nov. 6, 1973.

Referring to the drawing, the valve gate 9 as shown between the inlet body exit and the outlet body inlet comprises an annular body member 10 on which two dished discs 30 and 31 are retained. The edges of the discs are provided with the wedge faces which also consist of hard metal and cooperate with the body seats 54 and 55. The annular body member 10 is provided with shoulders 20 and 21 to accommodate the dished discs 30 and 31 with conical surfaces 22 and 23 radially beyond the shoulders. A clearance is also provided between the conical surfaces 22 and 23 and the corresponding adjacent surfaces of the discs 30 and 31. At the upper ends of the conical surfaces, the body member 10 is provided with undercuts 24 and 25 in which correspondingly shaped projections on the edges of the discs 30 and 31 are received. Similarly shaped projections on the lower edge of the discs 30 and 31 are received in corresponding undercuts in a retainer 35 which is secured to the body member 10 by screws which are not shown.

The shoulders 20 and 21 are eccentrically disposed on the body member, on the one hand because of the inclined arrangement of the valve gate 9 and on the other hand in order to minimize the dimensions of the discs 30 and 31. If the last-mentioned factor is unimportant, it is possible to construct the two discs 30, 31 of the same size and to dispose them centrally on the body member despite the inclined arrangement of the valve gate.

The upper end of the body member 10 is provided with a recess 56 into which the lower, thickened end of the operating stem 6 extends, the stem being connected to the valve gate 9 by means of a bolt 8 which extends through the body member and the stem 6.

On the inwardly facing sides, the dished discs 30 and 31 are provided with part-spherical domed protuberances 38 and 39 between which a central disc 40 is located. The central zone of each domed protuberance 38, 39 is provided with a hard metal layer to bear on the disc 40. The disc 40 is made of relatively soft steel.

The purpose of providing the central disc 40 and the domed protuberances 38, 39 in the manner described is to facilitate release of the valve gate 9. There is a risk of the gate 9 being moved into the closed position at a time when the temperature of the valve body 10 is higher than that of the valve gate 9 due to preceding temperature changes. The ensuring temperature equalization could cause the valve gate 9 to be so firmly jammed due to substantial contraction of the body 10 that the pull of the servo motor (not shown) which acts on the operating stem 6 is insufficient to release the valve gate 9. However, with the construction described, contraction of the body 10 will cause the protuberances 38 and 39 to become embedded in the disc 40 if the shrinkage forces of the body 10 exceed a certain value. This embedding is possible because of the clearance between the conical surfaces 22 and 23 and the adjacent surfaces of the discs 30 and 31. The surfaces of the central disc 40 are therefore deformed and this prevents excessive jamming of the valve gate. Generally, however, the valve gate 9 and the valve body 10 will have practically the same temperature so that the risk of jamming will occur only in rare cases.

The central disc 40 therefore constitutes a safety device and is able to perform repeatedly until the force required to produce a further deepening of the indentations exceeds the limit at which the friction between the valve gate 9 and the body seats 54 and 55 equals the opening force of the servo motor.

By contrast to the illustrated construction, it is possible to provide a part-spherical protuberance on only one of the two discs 30, 31, the side of the other disc which is nearest to the protuberance being then adapted to lie flat against the central disc 40.

The inclined arrangement of the valve gate axis and the arrangement in which the cross-section at the inlet of the outlet body end 4 is greater than the exit cross-section of the inlet body end 3 achieves not only a low pressure loss but also enables the pressure in the space of the valve body 10 containing the valve gate 9 to be utilized for measuring pressure difference. In this case, the second tapping 57 is therefore replaced by a tapping 57'. Instead of being positioned in the lower part of the valve body the tapping could be provided in the upper part, for example, on the neck 58.

In another modification using a wedge-shaped valve gate, the axis of motion of the gate is not at an angle but perpendicular to the axis of the inlet body end 3. In this case, the wedge angle is asymmetrical with respect to the axis of motion of the valve gate and, in this case, the exit cross-section of the inlet body end may be disposed perpendicular to the inlet body end axis.

What is claimed is:

1. A gate valve for controlling fluid flow having an inlet body end including an exit of predetermined cross-section for the fluid flow, an outlet body end including an inlet of a cross-section at least 5% larger than said exit cross-section and a valve gate adjacent and between said inlet and said outlet, said valve gate being wedge-shaped and having an axis inclined with respect to the axis of said inlet body end and wherein said valve further includes a body seat on said inlet body end in a plane perpendicular to said axis of said inlet body end and wherein said valve gate includes two sealing discs, each disc carrying a gate sealing surface, one of said discs having a domed protuberance on a surface facing the other disc and a central disc located between said sealing discs and having a surface facing said protuberance of a material softer than that of said protuberance and engageable with said protuberance.

2. A valve as set forth in claim 1 wherein said domed protuberance has a hard metal facing.

3. A valve as set forth in claim 1 which further includes a body seat on said inlet body end in a plane perpendicular to the axis of said inlet body end.

4. A valve as set forth in claim 1 which further includes a body seat on said inlet body end and said valve gate has a sealing surface parallel to and facing said body seat and which further includes an operating stem secured to said valve gate on an axis inclined with respect to said axis of said inlet body end.

5. A valve as set forth in claim 1 which further includes means for moving said valve gate at an inclined angle to the axis of said inlet body end.

6. In a valve, a valve gate including two sealing discs, each disc carrying a gate sealing surface, one of said discs having a domed protuberance on a surface facing the other disc and a central disc located between said sealing discs and having a surface facing said protuberance of a material softer than that of said protuberance and engageable with said protuberance.

7. In a valve as set forth in claim 6 wherein said domed protuberance has a hard metal facing.

8. In a valve as set forth in claim 6 wherein said valve gate is wedge shaped.

9. In a valve as set forth in claim 8 wherein said valve further includes an inlet body end including an exit for fluid flow and an outlet body end including an inlet for fluid flow, and wherein said wedge shaped valve gate is disposed between said exit and said inlet.

10. In a valve as set forth in claim 9 wherein said valve further includes an operating stem secured to said valve gate for moving said valve gate from between said exit and said inlet.

11. A gate valve for controlling fluid flow having an inlet body end including an exit of predetermined cross-section for the fluid flow, an outlet body end including an inlet of a cross-section at least 5% larger than said exit cross-section and a valve gate adjacent and between said inlet and said outlet, said valve gate including two sealing discs, each disc carrying a gate sealing surface, one of said discs having a domed protuberance on a surface facing the other disc and a central disc located between said sealing discs and having a surface facing said protuberance of a material softer than that of said protuberance and engageable with said protuberance.

12. A valve as set forth in claim 11 which further includes a body seat on said inlet body end in a plane perpendicular to the axis of said inlet body end, and said valve gate is wedge-shaped and has an axis perpendicular to said axis of said inlet body end.

13. A valve as set forth in claim 11 which further includes means for moving said valve gate perpendicular to the axis of said inlet body end.

* * * * *